(No Model.)
J. A. LITTLE.
HANDLE BAR ADJUSTING MECHANISM FOR BICYCLES.
No. 582,071. Patented May 4, 1897.
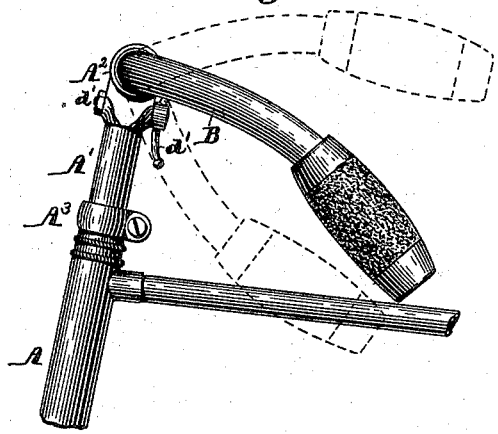
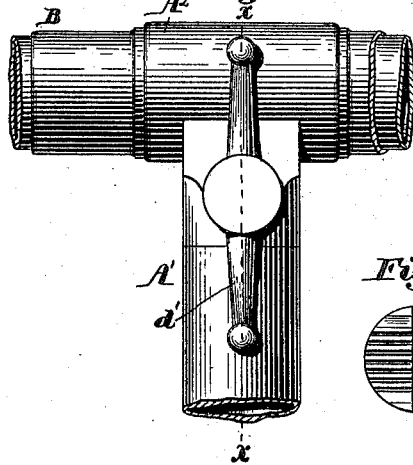
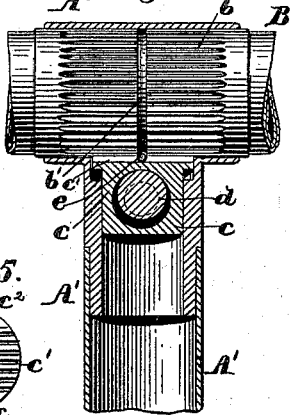
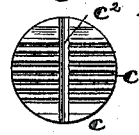
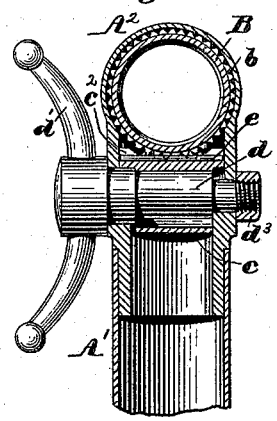
Witnesses:
Walter E. Lombard
A.C. Harmon
Inventor:
Joseph A. Little,
by Crosby Gregory
Attys.

UNITED STATES PATENT OFFICE.

JOSEPH A. LITTLE, OF LAWRENCE, MASSACHUSETTS, ASSIGNOR OF ONE-HALF TO HUGH P. SIMPSON, OF SAME PLACE.

HANDLE-BAR-ADJUSTING MECHANISM FOR BICYCLES.

SPECIFICATION forming part of Letters Patent No. 582,071, dated May 4, 1897.

Application filed February 29, 1896. Serial No. 581,273. (No model.)

*To all whom it may concern:*

Be it known that I, JOSEPH A. LITTLE, of Lawrence, county of Essex, State of Massachusetts, have invented an Improvement in Handle-Bar-Adjusting Mechanism for Bicycles, &c., of which the following description, in connection with the accompanying drawings, is a specification, like letters on the drawings representing like parts.

This invention has for its object to provide novel means for adjusting the handle-bar into any desired position and then clamping or holding the same.

In my invention I use an adjustable dog which when in use engages a ratcheted part of the handle to lock it in its adjusted position. This dog will preferably be toothed and be operated by a cam of suitable construction under the control of the rider.

Figure 1, in perspective, shows part of a bicycle with my improved handle shown in several of the positions it may occupy; Fig. 2, an enlarged view of the socket holding the handle-bar. Fig. 3 shows the socket broken out to exhibit the parts inside of it; Fig. 4, a partial section in the line $x\, x$, Fig. 2; Fig. 5, the dog in top view.

The frame A to receive the upper end of the wheel-fork (not shown) and the tubular shank A' of the socket $A^2$ are and may be of any usual or suitable shape, and the lower end of the tube will be held by the clamp $A^3$ in usual manner. The handle-bar B has at the middle of its length a series of ratchet-teeth $b$, preferably divided by an annular groove $b'$, the said toothed portion fitting the socket. The tube has fitted into it a dog $c$, preferably toothed at its upper end, as at $c'$, the said teeth being crossed by a groove $c^2$. The dog $c$ is shown as provided with a hole for the reception of an adjusting device, $d$ shown in Figs. 1 to 4 as a bolt having a cam or eccentric surface to act on the dog and move it longitudinally in the tube to engage and lock and hold the handle or tube retracted to release the handle, so that it may be turned in the socket to elevate or depress the handles. This bolt has a handpiece $d'$, which may be readily engaged by the hand of the rider when on the machine, and the sleeve may be so located and held in the upper end of the wheel-fork as to place the handpiece at the side of the sleeve next the rider or at the side away from the rider. The groove $c^2$ receives a locking device $e$, (shown as a wire lead in said groove $c^2$,) said locking device projecting above the teeth $c'$ and entering said groove $b'$ to prevent the handle from being withdrawn from or moved longitudinally in the socket when rotating it. To completely withdraw the handle, the bolt must be withdrawn as it may be after removing the nut $d^3$.

The handpiece may be turned by the rider when the machine is in motion and the handle be adjusted into any desired position.

With my invention a wrench need not be employed when it is desired to adjust the handle and make it a high or a low handle.

It will be seen that the dog $c$ and the locking device $c^2$, carried by it, (shown as a loose pin placed in a groove transversely to the direction of the teeth of the locking device,) are both moved and made effective to coöperate with the handle-bar having the longitudinal teeth and the annular groove by one and the same operation, the device employed to so operate the dog and the locking device being an eccentric-stud having its handle exposed at the side of the socket near the rider, so that the rider by engaging the handle of the stud may at any moment release the dog, turn the handle into the desired position, and again turn the eccentric to lock the dog.

Having described my invention, what I claim as new, and desire to secure by Letters Patent, is—

A bicycle handle-bar having teeth, and an annular groove intersecting said teeth, a socket to receive the toothed part of said handle-bar, a dog having a series of teeth to engage the teeth of the handle-bar, and a pin loosely placed lengthwise in a groove of the dog, combined with means to move said dog and pin causing the teeth of the dog to engage the toothed surface of the handle-bar and at the same time put the pin in the annular groove of the handle-bar, the pin preventing withdrawal of the handle-bar from its socket and the teeth preventing the rotation of the handle-bar in its socket, substantially as described.

In testimony whereof I have signed my name to this specification in the presence of two subscribing witnesses.

JOSEPH A. LITTLE. [L. S.]

Witnesses:
GEO. F. JACKSON,
H. J. GOUHL.